US011306520B2

(12) United States Patent
Jung et al.

(10) Patent No.: US 11,306,520 B2
(45) Date of Patent: Apr. 19, 2022

(54) HANDLE DEVICE

(71) Applicant: PIOLAX, INC., Yokohama (JP)

(72) Inventors: Bong Won Jung, Incheon (KR); Jung Hyung Cho, Incheon (KR)

(73) Assignee: PIOLAX, INC., Yokohama (JP)

( * ) Notice: Subject to any disclaimer, the term of this patent is extended or adjusted under 35 U.S.C. 154(b) by 586 days.

(21) Appl. No.: 16/185,216

(22) Filed: Nov. 9, 2018

(65) Prior Publication Data
US 2019/0145136 A1  May 16, 2019

(30) Foreign Application Priority Data
Nov. 13, 2017  (KR) .................. 10-2017-0150809

(51) Int. Cl.
| E05B 83/18 | (2014.01) |
| E05B 85/10 | (2014.01) |
| E05C 1/14 | (2006.01) |
| E05B 83/28 | (2014.01) |
| B60R 5/04 | (2006.01) |
| B62D 43/10 | (2006.01) |

(52) U.S. Cl.
CPC .............. *E05B 83/18* (2013.01); *E05B 83/28* (2013.01); *E05B 85/107* (2013.01); *E05C 1/145* (2013.01); *B60R 5/04* (2013.01); *B62D 43/10* (2013.01); *E05B 85/103* (2013.01); *E05Y 2900/538* (2013.01); *Y10S 292/31* (2013.01)

(58) Field of Classification Search
CPC .......... E05B 83/16; E05B 83/18; E05B 83/28; E05B 5/00; E05B 85/107; E05C 1/145; Y10S 292/31; Y10S 292/30
See application file for complete search history.

(56) References Cited

U.S. PATENT DOCUMENTS

| 947,528 | A | * | 1/1910 | Hunter | .................... E05B 85/22 |
| | | | | | 292/173 |
| 2,029,199 | A | * | 1/1936 | Segar | .................... E05B 85/107 |
| | | | | | 292/173 |
| 2,649,322 | A | * | 8/1953 | Mack | ...................... E05C 1/145 |
| | | | | | 292/173 |
| 2,812,204 | A | * | 11/1957 | Squire | .................... E05C 1/145 |
| | | | | | 292/334 |
| 3,214,207 | A | * | 10/1965 | Swanson | ............... E05C 19/145 |
| | | | | | 292/66 |
| 6,109,669 | A | * | 8/2000 | Pinkow | .................... E05C 1/145 |
| | | | | | 292/175 |

(Continued)

FOREIGN PATENT DOCUMENTS

| DE | 102010012125 A1 * | 9/2011 | ............... B60R 5/04 |
| DE | 102014005029 A1 * | 11/2014 | ............. E05C 1/145 |

(Continued)

*Primary Examiner* — Carlos Lugo
(74) *Attorney, Agent, or Firm* — McGinn I.P. Law Group, PLLC.

(57) ABSTRACT

There is provided a handle device. The handle device includes a base member, a handle member, and a swing member. The handle member has a grasp portion. The swing member includes a handle-side abutting portion, a base-side abutting portion, and a rotational pivot portion. As the handle-side abutting portion comes away from a bottom portion of the base member, the base-side abutting portion comes close to the bottom portion of the base member.

14 Claims, 8 Drawing Sheets

(56) References Cited

U.S. PATENT DOCUMENTS

| | | | | |
|---|---|---|---|---|
| 6,719,332 B2 * | 4/2004 | Sekulovic | ............... | E05C 3/162 292/165 |
| 7,052,053 B2 * | 5/2006 | Hall | ............... | E05C 3/162 292/126 |
| 7,083,205 B2 * | 8/2006 | Hall | ............... | E05B 63/14 292/175 |
| 7,182,374 B2 * | 2/2007 | Figge | ............... | B60R 5/04 292/334 |
| 7,204,528 B2 * | 4/2007 | Vitry | ............... | B60R 5/04 292/165 |
| 7,399,009 B2 * | 7/2008 | Hall | ............... | E05B 63/20 292/100 |
| 7,798,540 B1 * | 9/2010 | Vitry | ............... | E05C 3/162 292/216 |
| 7,914,054 B2 * | 3/2011 | Blake, III | ............... | E05C 1/145 292/173 |
| 8,876,177 B2 * | 11/2014 | Takada | ............... | E05C 1/145 292/336.3 |
| 9,062,474 B2 * | 6/2015 | Ibrahim | ............... | B25G 1/04 |
| 2009/0008950 A1 * | 1/2009 | Najima | ............... | B60R 5/04 292/336.3 |

FOREIGN PATENT DOCUMENTS

| | | | | | |
|---|---|---|---|---|---|
| EP | 1526236 | A2 | * | 4/2005 | ............... E05B 5/00 |
| FR | 979715 | A | * | 5/1951 | ............... E05B 85/14 |
| GB | 2180291 | | * | 11/1987 | |
| JP | 2006175977 | A | * | 7/2006 | |
| JP | 2009160957 | A | * | 7/2009 | |
| JP | 2009-262847 | A | | 11/2009 | |
| JP | 2010120584 | A | * | 6/2010 | |
| JP | 4777131 | B2 | * | 9/2011 | |
| JP | 2018197466 | A | * | 12/2018 | ............... E05B 5/00 |
| WO | WO-0019050 | A1 | * | 4/2000 | ............... E05C 1/145 |
| WO | WO-2018216736 | | * | 11/2018 | |

* cited by examiner

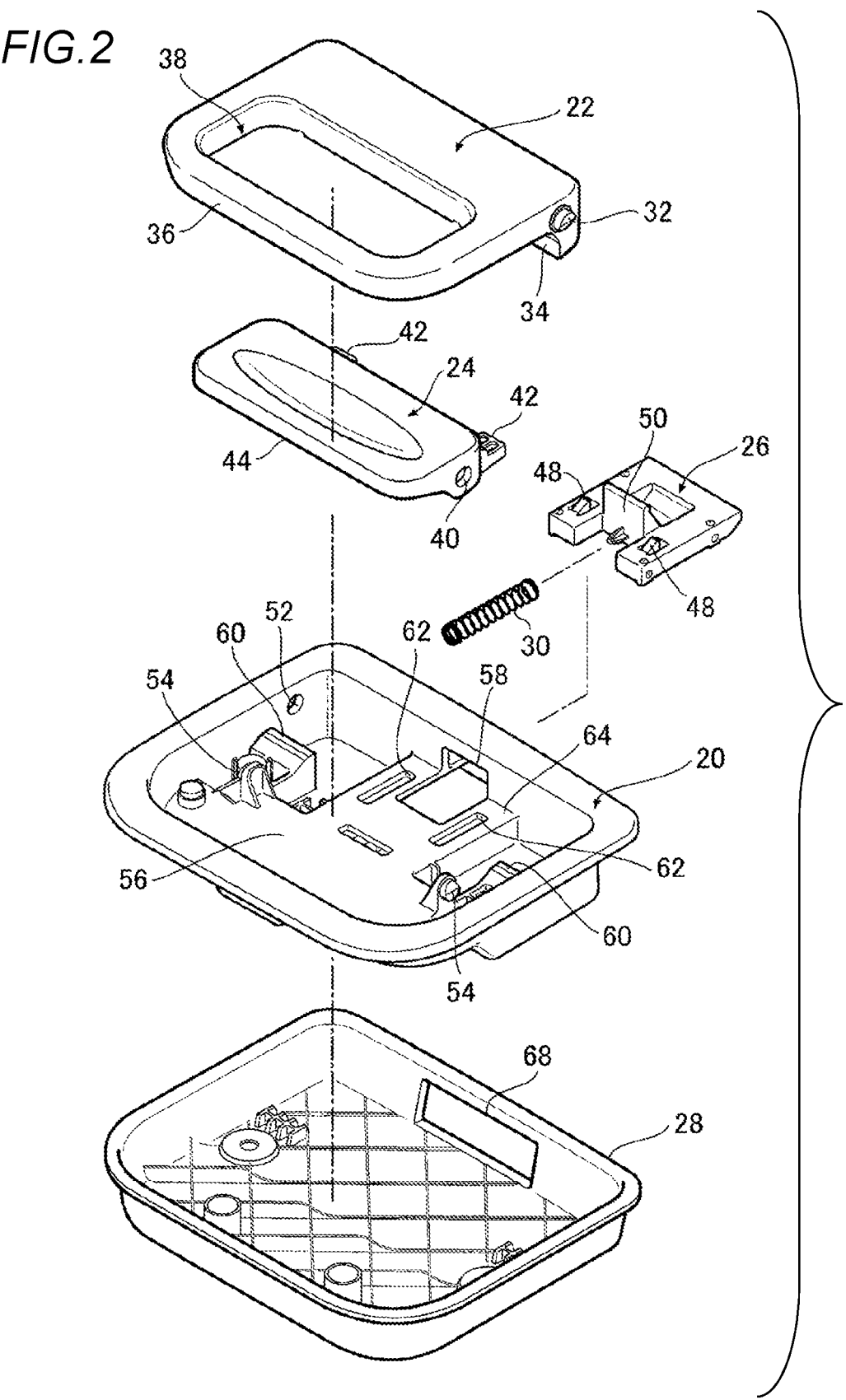

HANDLE DEVICE

CROSS-REFERENCE TO RELATED APPLICATIONS

The disclosure of Patent Application No. 10-2017-0150809 filed on Nov. 13, 2017 in Republic of Korea, including specification, drawings and claims is incorporated herein by reference in its entirety.

TECHNICAL FIELD

The present disclosure relates to a handle device, which can be grasped and lifted up by a user.

BACKGROUND

In a luggage compartment provided on a rear part of a vehicle, a flat plate shaped board is installed not only as a floor of the luggage compartment but also as a lid of a spare tire or accessory storage case provided under the luggage compartment. The board is provided with a handle device. When the storage case is opened, the handle device is grasped and lifted up together with the board by a user.

In Patent Document 1, a handle device for an automobile cabin is disclosed, which includes a concave-shaped base member, a handle member pivotally mounted on the base member, a support shaft for supporting the handle member, and a cover member pivotally mounted on the base member. The handle member is configured to be accommodated in the base member when not in use and also to be rotated and erected when in use. Rotation of the handle member is stopped when an edge of a base portion of the handle member bumps against a bottom of the base member.

Patent Document 1: Japanese Patent Application Publication No. 2009-262847A

In the technique of Patent Document 1, when a user erects and lifts up the handle member, a tensile load exerted on the handle member is born by the edge of the base portion of the handle member and the support shaft. However, it is desirable to further distribute the load.

SUMMARY

It is therefore one of objects of the present disclosure to provide a handle device, which can distribute a load exerted thereon when a handle member thereof is lifted up.

According to an aspect of the embodiments of the present disclosure, there is provided a handle device, comprising: a base member; a handle member pivotally supported on the base member; and a swing member pivotally supported on the base member, wherein the handle member has a grasp portion configured to take a second position, at which the grasp portion comes out of the base member from a first position, at which the grasp portion is accommodated in the base member, due to rotation of the handle member when being grasped, wherein the swing member comprises: a handle-side abutting portion configured to abut against the handle member when the grasp portion is lifted up; a base-side abutting portion configured to abut against the base member and thus to bear a load as the handle-side abutting portion abuts against the handle member and thus bears a load; and a rotational pivot portion pivotally supported on the base member and positioned between the handle-side abutting portion and the base-side abutting portion, and wherein the swing member is configured to rotate in such a manner that as the handle-side abutting portion comes away from a bottom portion of the base member, the base-side abutting portion comes close to the bottom portion of the base member.

According to the present disclosure, the handle device, which can distribute a load exerted thereon when the handle member is lifted up, can be provided.

BRIEF DESCRIPTION OF THE DRAWINGS

In the accompanying drawings:

FIG. 2 is an exploded view of the handle device;

DETAILED DESCRIPTION OF THE EMBODIMENTS

Hereinafter, an illustrative embodiment will be described in detail with reference to the accompanying drawings.

Figure 1B:
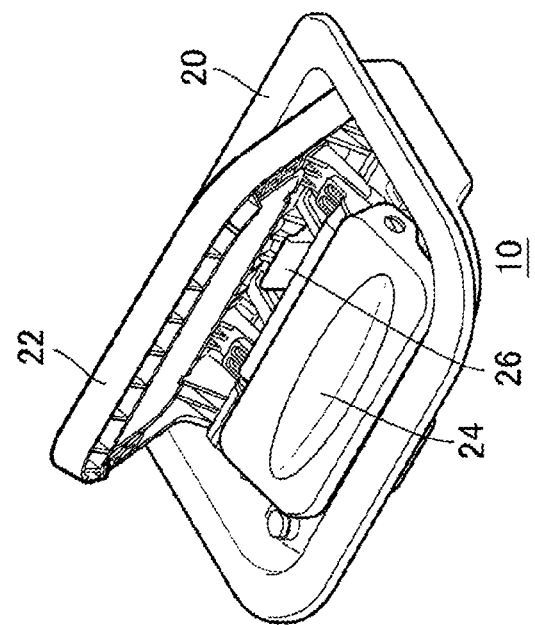
FIGS. 1A and 1B are perspective views of a handle device according to an embodiment.
Figure 1A:
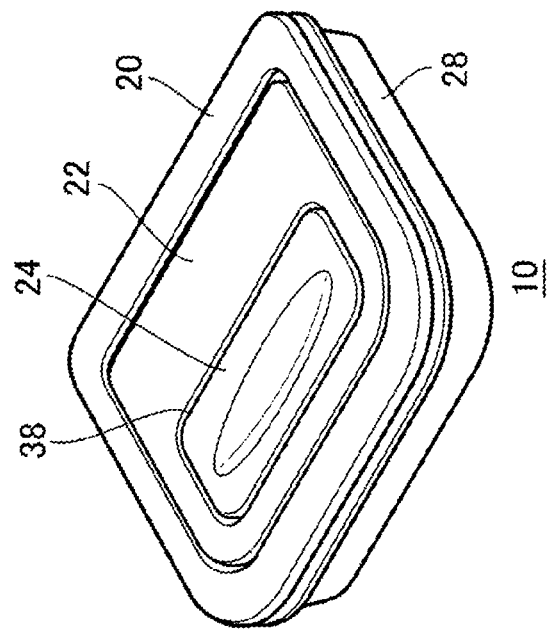

FIGS. 1A and 1B are perspective views of the handle device 10 according to an embodiment. FIG. 1A shows the handle device 10 in a state where a handle member 22 is accommodated, and FIG. 1B shows the handle device 10 in a state where the handle member 22 is erected.

The handle device 10 is provided, for example, on a board arranged in a luggage compartment on a rear part of a vehicle. The board has an opening portion formed to allow the handle device 10 to be attached thereto. A storage space is provided under the board, and thus a user can grasp the handle device 10 to lift up the board, thereby opening the storage space under the board.

The handle device 10 has a locking function to fix the board so that the board is not opened or shifted due to vibration generated during driving of the vehicle. The handle device 10 is locked on a to-be-locked portion on a vehicle body to fix the board in a closed state.

FIG. 2 is an exploded view of the handle device 10. The handle device 10 includes a base member 20, a handle member 22, a swing member 24, a lock member 26, a cover member 28 and a spring member 30.

The handle member 22 is pivotally supported on the base member 20 and is configured to be accommodated in the base member 20 when not in use as shown in FIG. 1A and also to be erected from the base member 20 when in use as shown in FIG. 1B. Rotation of the handle member 22 from the accommodated state in the base member 20 to the erected state is referred to as rotation in an opening direction, and also rotation thereof from the erected state to the accommodated state is referred to as rotation in a closing direction. The handle member 22 will be described with reference to FIG. 3.

Figure 3:
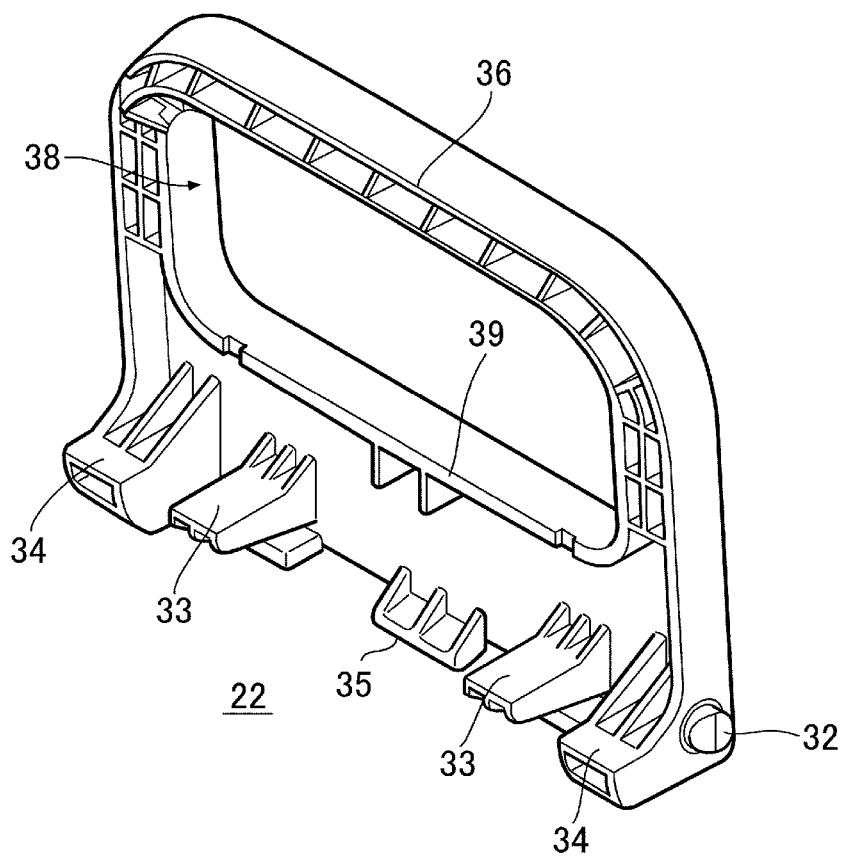
FIG. 3 is a perspective view of a handle member.

FIG. 3 is a perspective view of the handle member 22. The handle member 22 has handle pivot shafts 32, first extension portions 33, second extension portions 34, a third extension portion 35, a grasp portion 36, a slit 38 and an engaging portion 39.

The handle pivot shafts 32 are configured to protrude from respective side surfaces of the handle member 22 outward in an axial direction thereof and to be inserted into respective shaft hole portions 52 of the base member 20. The first extension portions 33, the second extension portions 34 and the third extension portion 35 are formed to extend perpendicular to a base plate of the handle member 22 and are positioned in the vicinity of a center axis of the handle pivot shafts 32.

The first extension portions 33 engage with the swing member 24 when the handle member 22 is rotated in the opening direction. The second extension portions 34 bump against the base member 20 when the handle member 22 is rotated in the opening direction, thereby stopping rotation of the handle member 22 in the opening direction. The third extension portion 35 engages with the lock member 26 and thus is configured to retract the lock member 26 when the handle member 22 is rotated in the opening direction.

The second extension portions 34 are formed in a pair on both edges of the handle member 22, the first extension portions 33 are formed in a pair between the pair of second extension portions 34, and the third extension portion 35 is formed between the pair of first extension portions 33.

The grasp portion 36 is formed in a rod shape. When being grasped by a user, the grasp portion 36 takes a second position, at which the grasp portion 36 comes out of the base member 20 from a first position, at which the grasp portion 36 is accommodated in the base member 20, due to rotation of the handle member 22 in the opening direction, and thus the grasp portion 36 is positioned to be graspable by the user.

The slit 38 is formed between the grasp portion 36 and the handle pivot shafts 32 to allow a finger of a user to be inserted therethrough. The engaging portion 39 is positioned on an edge of the slit 38 and thus configured to engage with the swing member 24 upon rotation of the swing member 24, thereby bearing a force caused by erection of the handle member 22.

Returning to FIG. 2, the swing member 24 is pivotally supported on the base member 20 and is formed in a rectangular plate shape. As shown in FIG. 1A, the swing member 24 is configured to close the slit 38 of the handle member 22 in the accommodated state. The swing member 24 functions as a button for changing the handle member 22 from the accommodated state into the erected state. The swing member 24 will be described with reference to FIG. 4.

Figure 4:
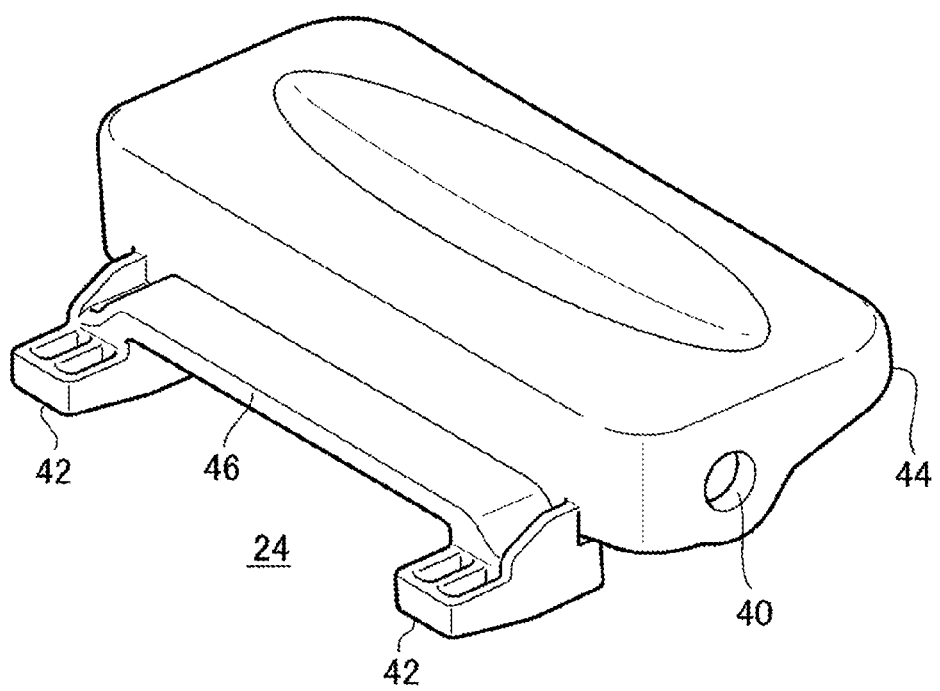
FIG. 4 is a perspective view of a swing member.

FIG. 4 is a perspective view of the swing member 24. The swing member 24 has rotational pivot portions 40, handle-side abutting portions 42, a base-side abutting portion 44 and an erected portion 46. The rotational pivot portions 40 are formed in a hole shape on respective side surfaces of the swing member 24 to allow respective pivot portions 54 of the base member 20 to be inserted therein.

The base-side abutting portion 44 is positioned on one end side of the swing member 24, the handle-side abutting portion 42 is positioned on the other end side of the swing member 24, and the rotational pivot portions 40 are positioned between the base-side abutting portion 44 and the handle-side abutting portions 42. Since the swing member 24 is pivotally supported by the rotational pivot portions 40, the swing member 24 is swingable. That is, the swing member 24 is pivoted in such a manner that if the base-side abutting portion 44 on the one end side thereof is lifted up, the handle-side abutting portions 42 on the other end side are lowered. The base-side abutting portion 44 is capable of abutting against a bottom portion of the handle member 22.

The handle-side abutting portions 42 are formed in a pair to protrude from the other end side of the swing member 24 and thus to engage with the respective first extension portions 33 of the handle member 22, thereby bearing a load upon rotation of the handle member 22 in the opening direction. The handle-side abutting portions 42 protrude more than the erected portion 46.

The erected portion 46 is formed to protrude from the other end side of the swing member 24 and also to connect the pair of handle-side abutting portions 42, thereby enhancing rigidity of the handle-side abutting portions 42. When the swing member 24 is rotated, the erected portion 46 engages with the engaging portion 39 of the handle member 22 so that the handle member 22 is pushed and erected in the opening direction. That is, if the one end side of the swing member 24 is pushed by a user, the swing member 24 is rotated so that the swing member 24 is erected. As a result, the erected portion 46 pushes up the engaging portion 39 of the handle member 22 to erect the handle member 22. In this way, the swing member 24 can close the slit 38 of the handle member 22 and also erect the handle member 22.

When the handle member 22 is rotated in the closing direction, the erected portion 46 bumps against the engaging portion 39, thereby returning the swing member 24 to the original position.

Returning to FIG. 2, the lock member 26 has claw portions 48 and a standing portion 50. The claw portions 48 are formed in a pair to protrude from an upper surface of the lock member 26. The claw portions 48 are configured to be slidably fitted into respective guide holes 62 of the base member 20.

The standing portion 50 stands on the upper surface of the lock member 26. The standing portion 50 is configured to engage with the third extension portion 35 of the handle member 22 so that the lock member 26 is retracted by movement of the third extension portion 35 caused due to rotation of the handle member 22 in the opening direction.

The spring member 30 is configured to abut against the lock member 26 at one end thereof and to abut against the base member 20 at the other end. Thus, the spring member 30 urges the lock member 26 in an advancing direction.

The base member 20 is formed in a rectangular box shape so that the handle member 22, the swing member 24, the lock member 26 and the spring member 30 can be accommodated therein. The base member 20 has shaft hole portions 52, pivot portions 54, an insertion hole 58, bearing portions 60, guide holes 62 and an accommodation portion 64.

The shaft hole portions 52 are formed in a pair on the respective side surfaces of the base member 20, and are configured to pivotally support the handle pivot shafts 32 of the handle member 22. Although in the present embodiment, the shaft hole portions 52 are formed in a hole shape and the handle pivot shafts 32 are formed in a protrusion shape, the shaft hole portions 52 may be formed in a protrusion shape and the handle pivot shafts 32 may be formed in a hole shape. In any case, the shaft hole portions 52 pivotally support the handle member 22 and bear a load from the handle member 22 when the handle member 22 is lifted up.

The bearing portions 60 are configured to bear rotation of the handle member 22 in the opening direction. That is, when the handle member 22 is rotated in the opening direction, the bearing portions 60 abut against the second extension portions 34 of the handle member 22, thereby stopping rotation of the handle member 22 and bearing a load from the handle member 22. The bearing portions 60 are formed in a pair in the shape of an arch having a ceiling portion.

The pivot portions 54 are formed in a pair in a protrusion shape and are configured to swingably support the swing member 24. A center axis of the pivot portions 54 is parallel to a center axis of the shaft hole portions 52.

The accommodation portion 64 is configured to accommodate a part of the lock member 26 therein. The guide holes 62 are formed in an elongated shape along an advancing and retracting direction of the lock member 26 and are configured to receive the claw portions 48 of the lock member 26 therein and to guide advancing and retracting of the lock member 26. The insertion hole 58 is formed to allow the standing portion 50 of the lock member 26 to be inserted into the base member 20.

The cover member 28 is formed in a box shape and is configured to cover the base member 20 at a lower side thereof. An opening edge of the board is sandwiched between the cover member 28 and the base member 20, thereby fixing the handle device to the board. The cover member 28 has, in a side surface thereof, an opening portion 68 for exposing the lock member 26.

Figure 5:
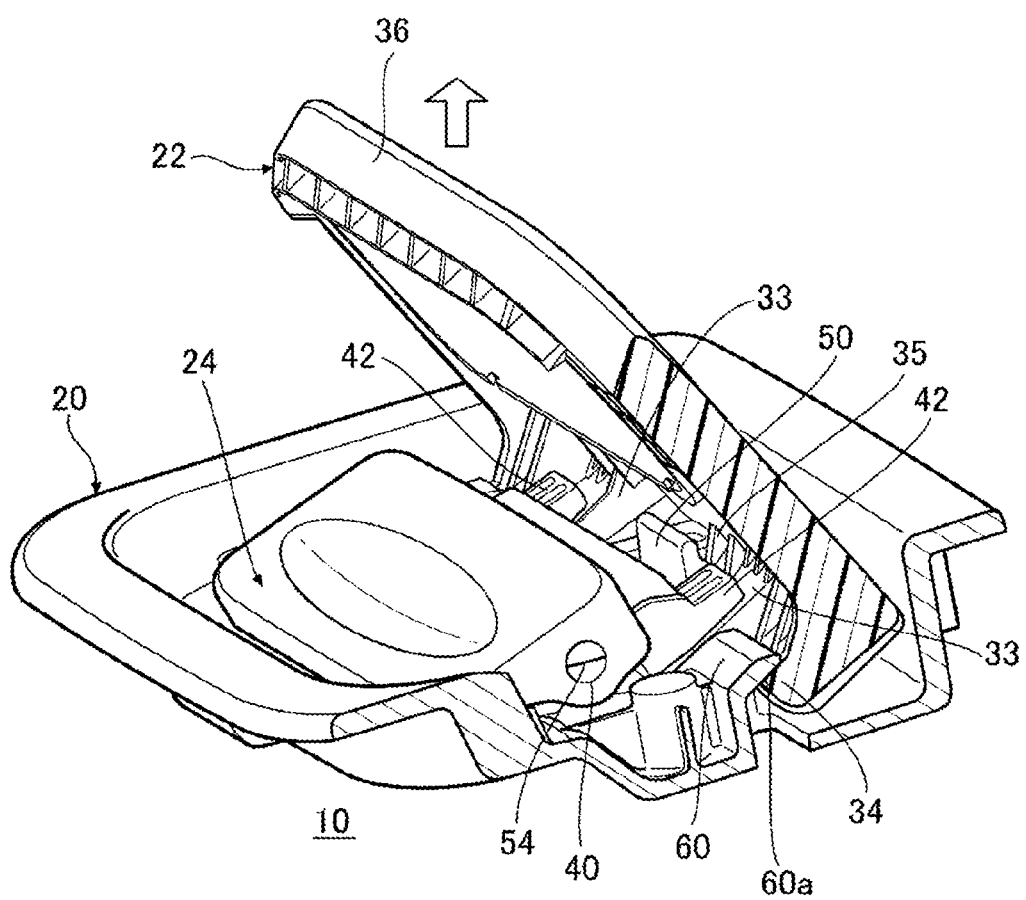
FIG. 5 is a sectional view of the handle device, illustrating engagement between a second extension portion and a bearing portion.

FIG. 5 is a sectional view of the handle device 10, illustrating engagement between the second extension portion 34 and the bearing portion 60. When the handle member 22 is lifted up by a user, an upward force is exerted on the handle member 22, thereby generating a rotational torque in the opening direction.

Thus, the shaft hole portions 52 of the base member 20 bear an upward force from the handle pivot shafts 32, thereby functioning as a first load bearing portion. The bearing portions 60 of the base member 20 bear a rotational torque in the opening direction from the second extension portions 34, thereby functioning as a second load bearing portion. The ceiling portion 60a of the bearing portions 60 has a wall shape and is inclined relative to the bottom portion 56. The bearing portions 60 are configured to be bendable.

Figure 6:
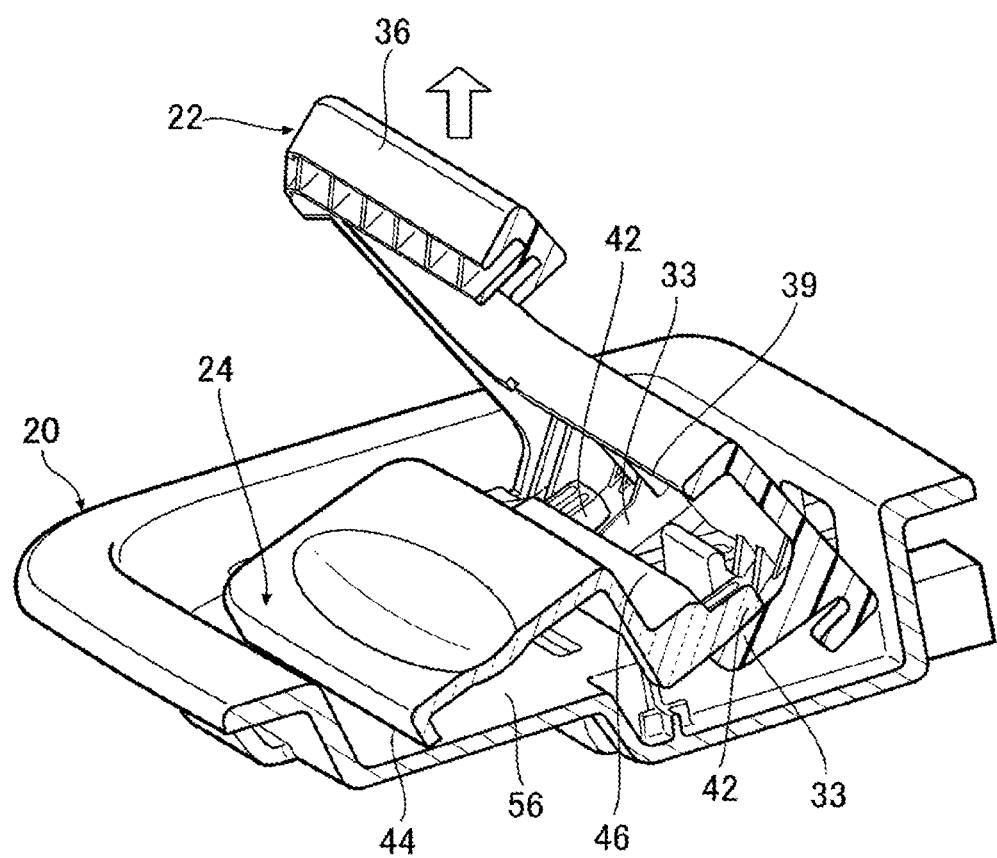
FIG. 6 is a sectional view of the handle device, illustrating engagement between a first extension portion and a handle-side abutting portion.

FIG. 6 is a sectional view of the handle device 10, illustrating engagement between the first extension portion 33 and the handle-side abutting portion 42. When the handle member 22 is lifted by a user, the handle-side abutting portion 42 abuts against the first extension portion 33 of the handle member 22.

As the handle-side abutting member 42 abuts against the first extension portion 33 of the handle member 22 and thus bears a load therefrom, the base-side abutting portion 44 abuts against the bottom portion 56 of the base member 20 and thus bears a load therefrom. That is, as the handle-side abutting portion 42 come away from the bottom portion 56 of the base member 20 due to a torque exerted from the first extension portion 33, the base-side abutting portion 44 comes close to and abuts against the bottom portion 56 of the base member 20.

The handle-side abutting portion 42 bear a rotational torque in the opening direction from the first extension portions 33, thereby functioning as a third load bearing portion. A load exerted from the first extension portion 33 is born by the pivot portion 54 and the bottom portion 56 via the rotational pivot portion 40 and the base-side abutting portion 44, respectively. Accordingly, the pivot portion 54 functions as a fourth load bearing portion and the bottom portion 56 functions as a fifth load bearing portion.

The swing member 24 can bear a load exerted on the handle member 22, thereby distributing the load and thus enhancing a load-bearing capacity of the handle device 10. By integrally forming the handle pivot shafts 32 of the handle member 22 with the handle member 22, a load-bearing capacity of the handle pivot shafts 32 is decreased as compared with the case where a separate metal shaft is used. However, since the swing member 24 can also bear a load, it is possible to inhibit the load-bearing capacity of the handle device 10 from being decreased. In addition, by integrally forming the handle pivot shafts 32 with the handle member 22, the handle member 22 can be manufactured at low cost.

When the handle member 22 is rotated in a direction, in which the grasp portion 36 is moved from the first position to the second position, i.e., when the handle member 22 is rotated in the opening direction, the handle member 22 may abut against the bearing portions 60 before the handle-side abutting portions 42. When the handle member 22 is lifted up, the second extension portions 34 abut against the bearing portions 60 and then the bearing portions 60 are bent by a load exerted from the second extension portion 34, so that the first extension portions 33 abut against the handle-side abutting portions 42. That is, as a load exerted on the handle member 22 is increased, the handle member 22 abuts against the swing member 24 as well as the bearing portions 60, thereby distributing the load.

Figure 7A:
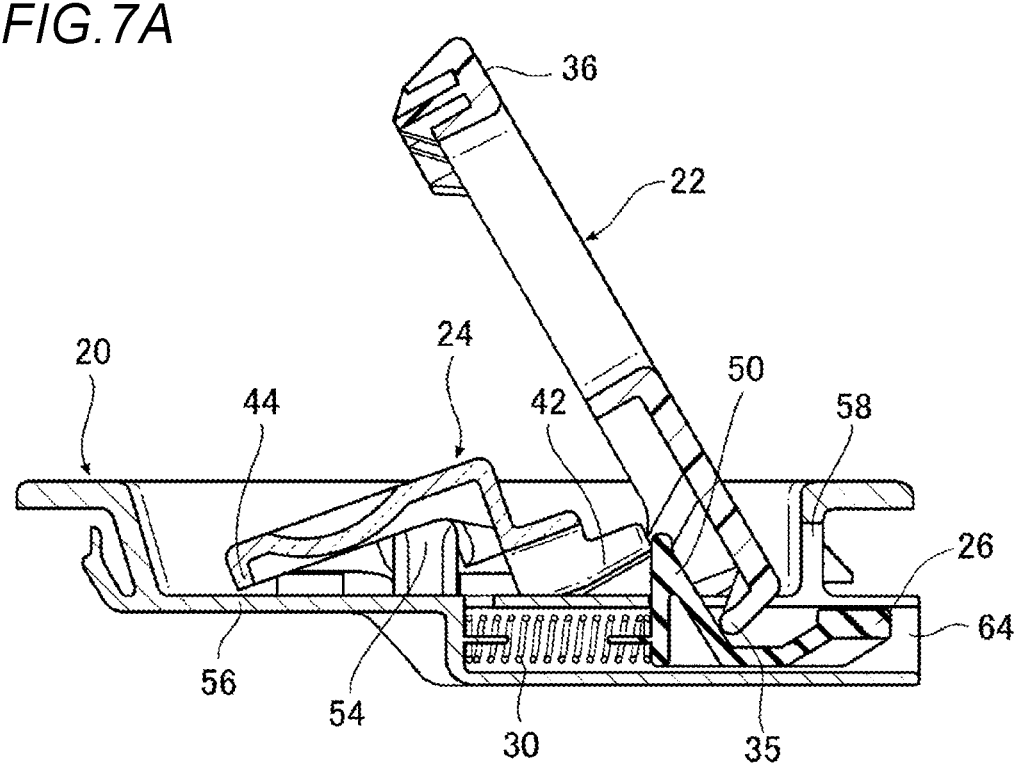
FIG. 7A is a sectional view of the handle device taken through the center thereof.
Figure 7B:
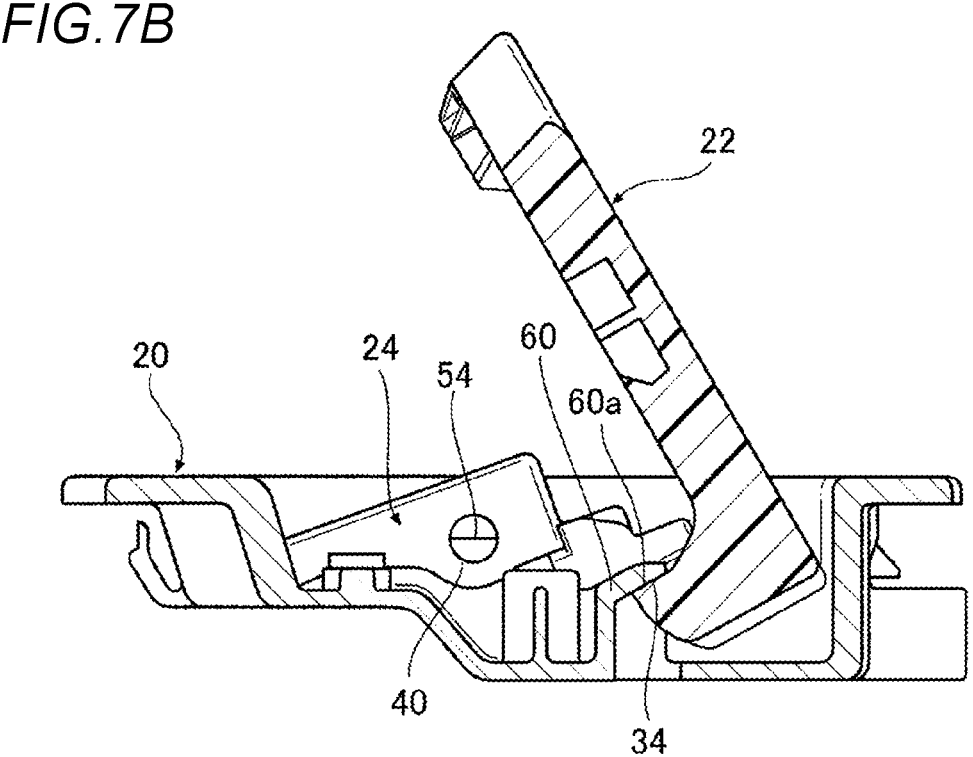
FIG. 7B is a section view of the handle device taken through the second extension portion and the bearing portion.

FIG. 7A is a sectional view of the handle device 10 taken through the center thereof, and FIG. 7B is a section view of the handle device 10 taken through the second extension portion 34 and the bearing portion 60. As shown in FIG. 7A, the third extension portion 35 of the handle member 22 pushes the standing portion 50 of the lock member 22 due to rotation of the handle member 22 in the opening direction, thereby retracting the lock member 26. Therefore, if the handle member 22 is lifted up by a user, the lock member 26 is retracted and thus become in an unlocked state.

When the user releases the hand from the handle member 22, the lock member 26 advances due to urging of the spring member 30, and also the third extension portion 35 of the handle member 22 is pushed by the standing portion 50 so that the handle member 22 is rotated in the closing direction.

FIG. 7B shows a sectional view taken at the same position as that of the sectional view of the handle device 10 shown in FIG. 5. The second extension portion 34 of the handle member 22 abuts against the ceiling portion 60a of the bearing portion 60, thereby causing the bearing portion 60 to be bent when a large load is exerted thereon.

Figure 8:
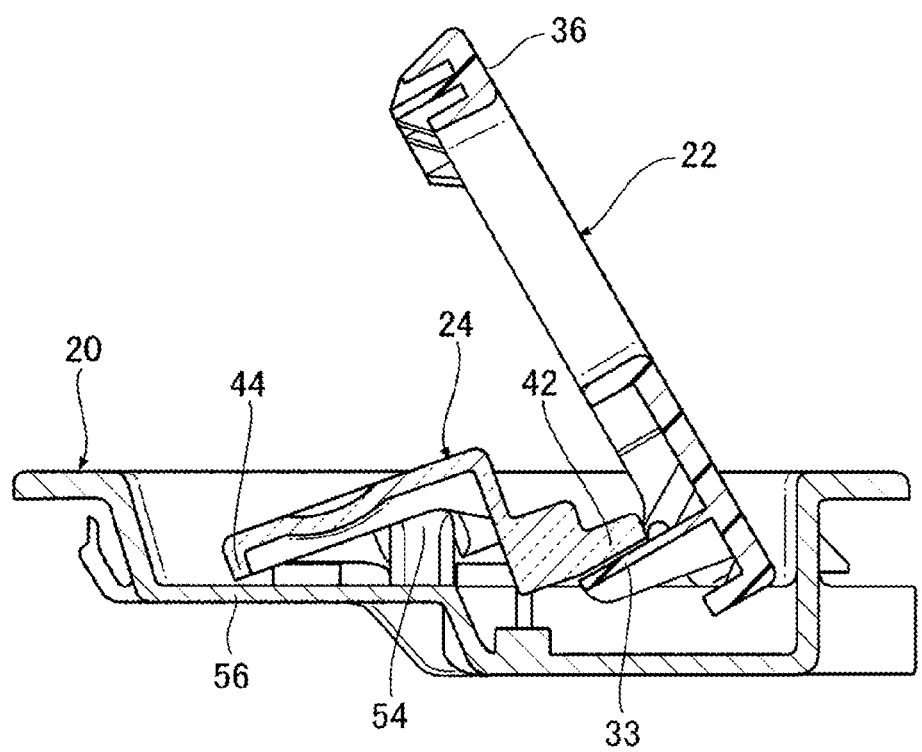
FIG. 8 is a sectional view of the handle device taken through the first extension portion and the handle-side abutting portion.

FIG. 8 is a sectional view of the handle device 10 taken through the first extension portion 33 and the handle-side abutting portion 42. FIG. 8 shows a sectional view taken at the same position as that of the sectional view of the handle device 10 shown in FIG. 6. The first extension portion 33 and the handle-side abutting portion 42 are not in contact with each other, and also the base-side abutting portion 44 and the bottom portion 56 are not in contact with each other. If a large load is exerted on the handle member 22 when the board is lifted up, the bearing portion 60 is bent so that the first extension portion 33 abuts against the handle-side abutting portion 42 and also the base-side abutting portion 44 abuts against the bottom portion 56, thereby distributing the load. Therefore, it is possible to reliably abut the second extension portions 34 against the bearing portions 60, the first extension portions 33 against the handle-side abutting portions 42 and also the base-side abutting portion 44 against the bottom portion 56 at high loads regardless of dimensional variations and assembly precision, thereby enhancing a load-bearing capacity of the handle device 10.

The present invention is not limited to the foregoing embodiments, and accordingly various modifications, such as design changes, can be made to each of the embodiments based on knowledge of those skilled in the art. Such modifications are intended to be encompassed within the scope of the present invention.

What is claimed is:

1. A handle device, comprising:
a base member;
a handle member pivotally supported on the base member; and
a swing member pivotally supported on the base member,
wherein the handle member has a grasp portion configured to take a second position, at which the grasp portion comes out of the base member from a first position, at which the grasp portion is accommodated in the base member, due to rotation of the handle member when being grasped,
wherein the swing member comprises:
a handle-side abutting portion configured to abut against the handle member when the grasp portion is lifted up;
a base-side abutting portion configured to abut against the base member and. thus to bear a load as the handle-side abutting portion abuts against the handle member and thus bears a load; and
a rotational pivot portion pivotally supported on the base member and positioned between the handle-side abutting portion and the base-side abutting portion,
wherein the swing member is configured to rotate in such a manner that as the handle-side abutting portion comes away from a bottom portion of the base member, the base-side abutting portion comes close to the bottom portion of the base member,
wherein the handle member comprises a first extension portion extending toward the bottom portion of the base member,
wherein, after the swing member is rowed, the first extension portion is configured to engage with the handle-side abutting portion from a side of the bottom portion of the base member to bear a load on the swing member, when the grasp portion is lifted up, and
wherein as the first extension portion of the handle member abuts abuts against the handle-side abutting portion and thus bears the load therefrom, the base-side abutting portion abuts against the bottom portion of the base member and thus bears a load therefrom.

2. The handle device according to claim 1, wherein the base member has a bearing portion configured to bear rotation of the handle member in a direction, in which the grasp portion is moved from the first position to the second position.

3. The handle device according to claim 2, wherein the handle member is configured to abut against the bearing portion before the handle-side abutting portion when being rotated in the direction, in which the grasp portion is moved from the first position to the second position.

4. The handle device according to claim 1,
wherein the handle member has a slit between the grasp portion and a handle pivot shaft, and
wherein the swing member is configured such that:
when the grasp portion is positioned at the first position, the swing member closes the slit; and
when one end side thereof including the base-side abutting portion is pushed toward the base member, the swing member is rotated and thus the other end side thereof including the handle-side abutting portion is erected to hump against the handle member, thereby rotating the handle member in the direction, in which the grasp portion is moved from the first position to the second position.

5. The handle device according to claim 1, wherein the first extension portion engages with the swing member when the handle member is rotated in a second position.

6. The handle device according to claim 2, wherein the first extension portion engages with the swing member when the handle member is rotated in a second position.

7. The handle device according to claim 2, wherein the bearing portion is configured to be bendable by a load from the handle member such that the handle member abuts against the handle-side abutting portion.

8. The handle device according to claim 7, wherein the hearing portion further includes a ceiling portion, and wherein the bearing portion is fainted in an arch shape.

9. A handle device, comprising:
a base member;
a handle member pivotally supported on the base member; and
a swing member pivotally supported on the base member,
wherein the handle member has a grasp portion configured to take a second position, at which the grasp portion comes out of the base member from a first position, at which the grasp portion is accommodated in the base member, due to rotation of the handle member when being grasped,
wherein the swing member comprises:
a handle-side abutting portion configured to abut against the handle member when the grasp portion is lifted up;
a base-side abutting portion configured to abut against the base member and thus to bear a load as the handle-side abutting portion abuts against the handle member and thus bears a load; and
a rotational pivot portion pivotally supported on the base member and positioned between the handle-side abutting portion and the base-side abutting portion,
wherein the swing member is configured to rotate in such a manner that as the handle-side abutting portion comes away from a bottom portion of the base member, the base-side abutting portion comes close to the bottom portion of the base member,
wherein the base member has a bearing portion configured to bear rotation of the handle member in a direction, in which the grasp portion is moved from the first position to the second position,
wherein, after the swing memeber is rotated, the handle member is configured to abut against the bearing portion before the handle-side abutting portion when being rotated in the direction, in which the grasp portion is moved from the first position to the second position,
wherein the bearing portion is configured to be bent by a load from the handle member such that the handle member abuts against the handle-side abutting portion, and wherein as the handle member abuts against the handle-side abutting portion and thus bears a load therefrom, and as the handle member abuts against the bearing portion and thus bears a load therefrom, the base-side abutting portion abuts against the bottom portion of the base member and thus bears a load therefrom.

10. The handle device according to claim 9,
wherein the handle member has a slit between the grasp portion and a handle pivot shaft, and
wherein the swing member is configured such that:
   when the grasp portion is positioned at the first position, the swing member closes the slit; and
   when one end side thereof including the base-side abutting portion is pushed toward the base member, the swing member is rotated and thus the other end side thereof including the handle-side abutting portion is erected to bump against the handle member, thereby rotating the handle member in the direction, in which the grasp portion is moved from the first position to the second position.

11. The handle device according to claim 9, wherein a first extension portion engages with the swing member when the handle member is rotated in a second position.

12. The handle device according to claim 9, wherein the bearing portion further includes a ceiling portion, and wherein the bearing portion is formed in an arch shape.

13. The handle device according o claim. 9, wherein the handle member includes:
   a first extension portion that engages with the swing member; and
   a second extension portion that bumps against the base member;
wherein the second extension portion abuts against the bearing portion, and
wherein the bearing portion is bent by a load exerted from the second extension portion.

14. The handle device according to claim 10, wherein a first extension portion engages with the swing member when the handle member is rotated in a second position.

\* \* \* \* \*